US009388054B2

(12) United States Patent
Gutierrez et al.

(10) Patent No.: US 9,388,054 B2
(45) Date of Patent: Jul. 12, 2016

(54) FLUORIDE-BASED LUMINESCENT PHOSPHORS

(71) Applicant: Southwest Research Institute, San Antonio, TX (US)

(72) Inventors: Robert D. Gutierrez, San Antonio, TX (US); Benjamin R. Furman, San Antonio, TX (US); Charles K. Baker, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 146 days.

(21) Appl. No.: 14/279,134

(22) Filed: May 15, 2014

(65) Prior Publication Data
US 2015/0329776 A1    Nov. 19, 2015

(51) Int. Cl.
*C09K 11/77* (2006.01)
*C01F 17/00* (2006.01)

(52) U.S. Cl.
CPC .......... *C01F 17/0062* (2013.01); *C01F 17/0031* (2013.01); *C09K 11/7705* (2013.01); *C09K 11/7773* (2013.01); *C01P 2002/01* (2013.01); *C01P 2002/60* (2013.01); *C01P 2002/72* (2013.01); *C01P 2002/74* (2013.01); *C01P 2002/85* (2013.01); *C01P 2004/51* (2013.01); *C01P 2004/61* (2013.01); *C01P 2004/62* (2013.01); *C01P 2004/64* (2013.01); *C01P 2006/60* (2013.01)

(58) Field of Classification Search
CPC ............... C09K 11/7766; C09K 11/61; C09K 11/7704; C09K 11/7705; C09K 11/7719; C09K 11/7732; C09K 11/7733; C09K 11/7747; C09K 11/7748; C09K 11/7751; C09K 11/7757; C09K 11/7762; C09K 11/7763; C09K 11/7772; C09K 11/7773; C09K 11/779; C09K 11/7791; C04B 2235/401; C04B 2235/444; C04B 2235/445; C04B 2235/5454; C04B 2235/5445; C04B 2235/724; C04B 35/50; C04B 35/593; C04B 35/62675; B82Y 5/00; B82Y 40/00; B82Y 10/00; B82Y 20/00; B82Y 15/00; B82Y 99/00; C01P 2004/64; C01P 2004/61; H01L 33/502; H01L 33/504; H01L 33/501
USPC .................. 252/301.4 R, 301.4 H; 428/402; 313/503; 977/773, 932, 774, 902, 775, 977/840, 904
See application file for complete search history.

(56) References Cited

U.S. PATENT DOCUMENTS

| 8,247,198 B2 | 8/2012 | Gorke et al. | |
| 2010/0314992 A1* | 12/2010 | Wang | C09K 11/06 313/503 |
| 2011/0127445 A1* | 6/2011 | Zhang | A61K 41/0071 250/459.1 |
| 2012/0164049 A1* | 6/2012 | Chaput | B01J 13/0091 423/263 |

OTHER PUBLICATIONS

Abbott, "Deep Eutectic Solvents", 2003, Chemistry Department, Universyt of Leicester, www.le.ac.uk, pp. 1-70, particularly pp. 1, 5, 6, 23, 24, 51 and 60.*
Sheng et al., "Solvothermal Synthesis and Luminescence Properties of BaCeF5:Tb3+,Sm3+ Nanocrystals: An Approach for White Light Emission", Aug. 14, 2012, J. Phys. Chem. C, 116, pp. 19597-19603.*
J-C Boyer, et al "Synthesis of Colloidal Upconverting NaYF4 Nanocrystals Doped With Er3+, Yb3+ and Tm3+, Yb3+ via Thermal Decomposition of Lanthanide Trifluoroacetate Precursors"; J. Am. Chem. Soc. 2006, 128, pp. 7444-7445.
P-C Jhang, et al "A Fully Integrated Nanotubular Yellow-Green Phosphor From an Environmentally Friendly Eutectic Solvent"; Angewandte Chemie Int. Ed. 2009, 48, pp. 742-745.
T. Jiang, et al "Citric Acid-assisted Hydrothermal Synthesis of α-NaYF4:Yb3+, Tm3+ Nanocrystals and Their Enhanced Ultraviolet Upconversion Emissions" CrystEngComm, 2012, 14, pp. 2302-2307.
C. Li, et al "Highly Uniform and Monodisperse β-NaYF4:Ln3+ (Ln=Eu, Tb, Yb/Er, and Yb/Tm) Hexagonal Microprism Crystals: Hydrothermal Synthesis and Luminescent Properties"; Inorganic Chemistry, vol. 46, No. 16, 2007, pp. 6329-6337.
Z. Li, et al "An Efficient and User-friendly Method for the Synthesis of Hexagonal-phase NaYF4:Yb, Er/Tm Nanocrystals With Controllable Shape and Upconversion Fluorescence"; Nanotechnology 19, 2008, 345606, 5pp.
Y-C Liao, et al "Direct White Light Phosphor: A Porous Zinc Gallophosphate With Tunable Yellow-to-White Luminescence"; J. Am. Chem. Soc., 2007, 127, pp. 9986-9987.
N. Niu, et al "Rapid Microwave Reflux Process for the Synthesis of Pure Hexagonal NaYF4:Yb3+, Ln3+, Bi3+ (Ln3+=Er3+, Tm3+, Ho3+) and its Enhanced UC Luminescence"; Journal of Materials chemistry, 2012, 22, pp. 21613-21623.
L L-H Sze, "Functional Ionic Liquids and Deep Eutectic Solvents for Luminescence Sensing Applications and Carbon Capture"; A Thesis to the Faculty of the Graduate School @ the University of Missouri-Columbia, May 2013, 91pp.
Y. Wang, et al "Upconverson Luminescence of (β-NaYF4: Yb3+, Er3+ @ β-NaYF4 Core/Shell Nanoparticles: Excitation Power Density and Surface Dependence"; J. Phys. Chem. C 2009, 113, pp. 7164-7169.

(Continued)

*Primary Examiner* — Matthew E Hoban
*Assistant Examiner* — Lynne Edmondson
(74) *Attorney, Agent, or Firm* — Grossman, Tucker et al

(57) ABSTRACT

The present disclosure relates to luminescent phosphors and more particularly, to fluoride-based luminescent phosphors, and methods for their preparation in deep eutectic solvent (DES) systems. The luminescent phosphors are formed with accompanying particle size control, relatively higher crystallinity and relatively higher fluorescence intensity.

15 Claims, 11 Drawing Sheets

(56) References Cited

OTHER PUBLICATIONS

L. Xiao, et al "Luminescent Properties of BaAl 12 O19:Tb, Dy Phosphors Prepared by Sol-Gel Method"; Journal of Nanoscience and Nanotechnology, vol. 14, 2014, pp. 4570-4573.

G. Yi, et al "Synthesis, Characterization, and Biological Application of Size-Controlled Nanocrystalline NaYF4:Yb, Er Infrared-to-Visible Up-Converson Phosphors"; Am. Chem. Soc., Nano Letters, 2004, vol. 4, No. 11, pp. 2191-2196.

Q. Zhang, et al "Deep Eutectic solvents: Syntheses, Properties and Applications"; Chem. Soc. Rev., 2012, 41, pp. 7108-7146.

* cited by examiner

FLUORIDE-BASED LUMINESCENT PHOSPHORS

TECHNICAL FIELD

The present invention relates to luminescent phosphors and more particularly, to fluoride-based luminescent phosphors, and methods for their preparation in deep eutectic solvent (DES) systems. The luminescent phosphors are formed with accompanying particle size control, relatively higher crystallinity and relatively higher fluorescence intensity.

BACKGROUND

Luminescent phosphors (LP) have shown promising utility in biomedical imaging, cancer and antimicrobial therapies, telecommunications, lasers, display technology, water treatment and solar radiation capture. Rare-earth doped fluoride luminescent phosphors have been shown to vary greatly in their photoluminescence intensities depending on the crystal size, degree of crystallinity, and morphology. For $NaYF_4$ and other iso-structural lanthanide-based materials, the hexagonal ($\beta$) phase has been shown to have relatively brighter photoluminescence relative to the cubic ($\alpha$) phase.

Such fluoride-based luminescent phosphors have traditionally been synthesized under conditions that either are restrictive in scale, or lead to excessive particle growth. Template-based methods rely on the use of capping agents, such as oleic acid, to direct the structural formation of plate-like or rod-like crystalline particles. Recently, preparation of $\beta$-$NaYF_4$ by a microwave-assisted route in ethylene glycol at 160° C. without the use of a template has been achieved. See, N. Niu, F. He, S. Gai et al, *J. Mater. Chem.* 22: 21613 (2012).

The use of reduced temperatures and template-free synthetic methods is desirable to improve scalability of fluoride-based luminescent phosphors. However, in known methods the resulting crystals are often greater than 1 micron which limits their application. There is a need for new methods that provide better control of the size of the crystals so as to provide luminescent phosphors with optimal or custom performance characteristics.

SUMMARY OF THE INVENTION

The present invention is directed to new compositions and methods of preparing submicron crystals of fluoride-based luminescent phosphors (LPs) in deep eutectic solvents. More specifically, the method comprises preparing a luminescent phosphor of the formula AMFz via the following reaction in a deep eutectic solvent along with heating and under pressure:

$$A(X)_m + M(X)_n + zNH_4F \rightarrow AMFz + zNH_4X$$

wherein

A is an alkali (Group 1) or alkali earth (Group 2) metal or a mixture of one or more alkali and/or alkali earth metal;

X is a halogen or $NO_3$ group;

M is a di-, tri- or tetravalent metal or metalloid,

F is fluoride;

z is the integer 4 or 5;

m is the integer 1 or 2; and n is the integer 3.

BRIEF DESCRIPTION OF THE DRAWINGS

These and other features and advantages will be better understood by reading the following detailed description, taken together with the drawings wherein.

DETAILED DESCRIPTION

Figure 1A:
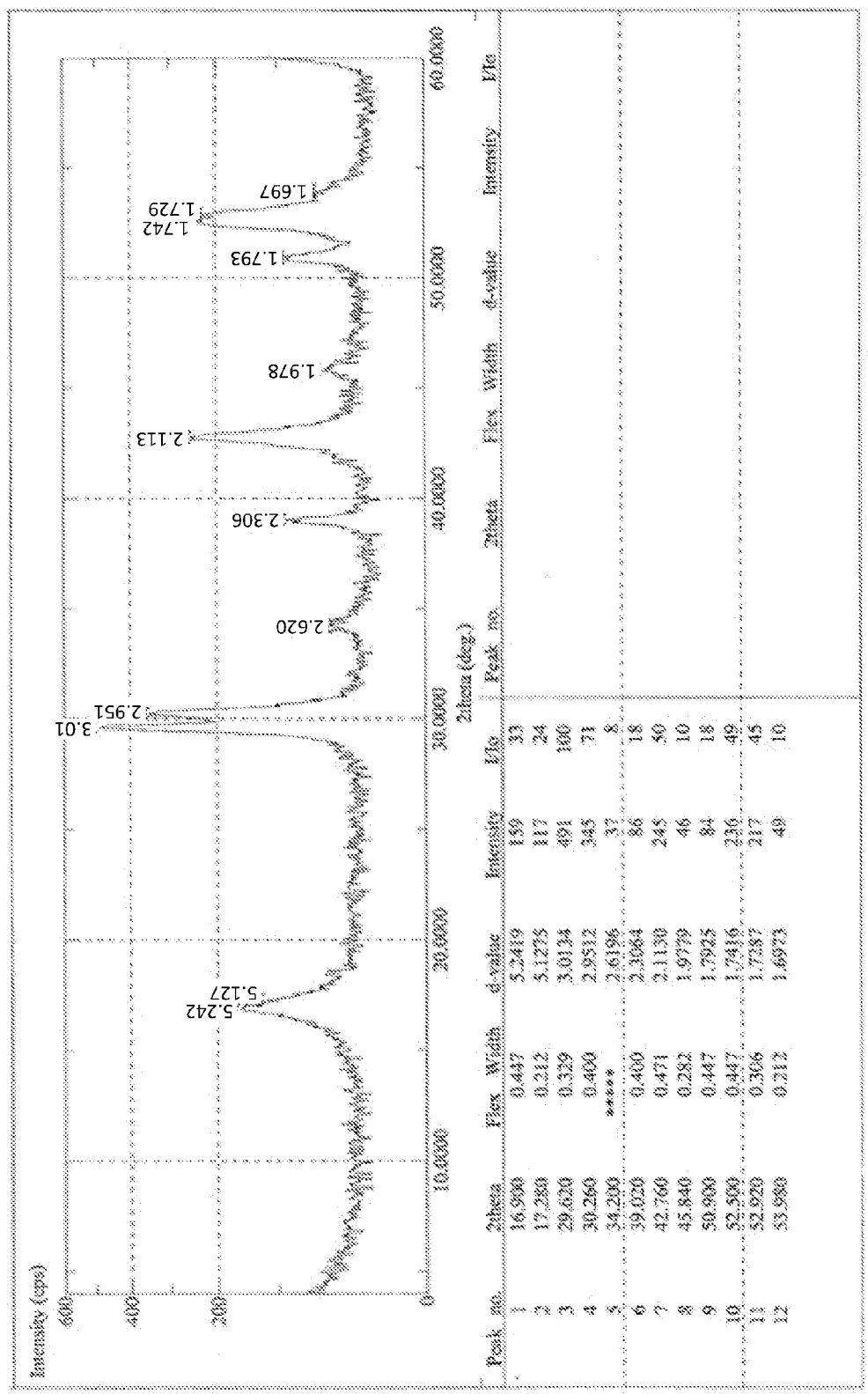
FIGS. 1A and B are XRD graphs of compositions prepared with different solvent systems showing increased peak intensities using glycerol:ChCl DES (A) solvent system versus ethylene glycol alone (B).

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

As noted above, the present disclosure relates to the preparation of fluoride-based luminescent phosphors, and methods for their preparation in deep eutectic solvent (DES) systems. It should be initially noted that a fluoride-based luminescent phosphor is generally understood herein as a compound containing the element fluorine which is capable of releasing stored energy by stimulation with light energy to produce a luminescence signal.

A "deep eutectic solvent" (DES) is understood herein as a liquid prepared by the mixing of a first component, an ionic (salt) compound, with a second component, a hydrogen bond donor (H-bond donor). The mixture provides a eutectic with a melting point that is lower than the individual components. The salt may preferably contain an ammonium, quaternary ammonium or phosphonium cation along with a halide or nitrate counter ion. The hydrogen bond donor may preferably include an alcohol or a polyol, a thiol, an amine, an amide or a carboxylic acid.

"Degree of crystallinity" represents the ratio of crystal to amorphous state in a given composition. It may be evaluated by x-ray diffraction techniques as described herein.

"Brightness" means the fluorescent intensity of a given composition. It may be evaluated by considering the fluorescence intensity (arbitrary units) versus wavelength (nm).

The preparation of fluoride-based luminescent phosphor particles herein has now been achieved successfully in submicron size (<1.0 μm) using a deep eutectic solvent system. In particular, luminescent phosphors of the formula AMFz, as described more fully below, have been prepared as particulate compositions having submicron size with relatively narrow size distribution, relatively high degrees of crystallinity, and relatively high photoluminescence intensity as compared to preparation in the absence of the use of a deep eutectic solvent. In addition, the present methods preferably do not rely upon the use of templates to direct the structural features of any as formed particles. Reference to template is reference to the use of an additional reagent that is employed to influence as-formed particle characteristics, such as driving the formation of plate or rod-like crystalline particle formation.

As noted above, the compositions prepared according to methods of the invention have the general formula $$AMFz$$

wherein A is an alkali (Group 1) or alkali earth (Group 2) metal or mixture of one or more alkali and/or alkali earth metal, M is a di-, tri- or tetravalent metal or metalloid, including rare-earth or mixtures of one or more rare-earth elements, F is fluoride, and z is an integer 4 or 5. Preferably, A may be an alkali or alkali earth metal including lithium, sodium, potassium, rubidium, cesium, francium, beryllium, magnesium, calcium, strontium, barium and radium or mixtures thereof. Most common embodiments herein include preferably lithium, sodium, potassium, magnesium and strontium or mixtures thereof. Preferably, M may include elements of group IIIB including yttrium, scandium, lanthanum, ytterbium, erbium and all lanthanide elements (e.g., Ce, Pr, Nd or mixtures thereof). Most common embodiments include preferably yttrium, gadolinium, ytterbium, erbium or mixtures thereof. Most common tetrafluoride compositions include $NaYF_4$. Most common pentafluoride compositions include $SrYF_5$.

Deep Eutectic Solvents

The compositions herein are all advantageously prepared in a deep eutectic solvent system. As noted, in general, this is reference to a liquid prepared by the mixing of a first component of an ionic (salt) compound with second component of a hydrogen bond donor (H-bond donor). Such solvents utilized herein preferably have a eutectic melting point of ≤100° C. In general, the ionic salt compound and hydrogen bond donor may be present at a ratio of 1:10 to 10:1.

The ionic salts may preferably include a monovalent or multivalent cation associated with one or more anions or mixture thereof. Suitable cations include, but are not limited to, alkali metals, alkaline earth metals, transition metals, saturated or unsaturated protonated primary, secondary, ternary amines with straight, branched or cyclic chains, quaternary amines, with straight, branched or cyclic chains. Suitable anions include, but are not limited to, halides including chloride, bromide, iodide, sulfate, phosphate, and nitrate. For example, the salt may be chosen from one of $CaCl_2$, $MgCl_2$, $ZnCl_2$, $SnCl_2$, $FeCl_3$, choline chloride, choline bromide, acetyl choline chloride, ethylammonium chloride, triethyl ammonium chloride, tetrabutyl ammonium chloride, trietylbenzyl ammonium chloride, or tetrabutyl phosphonium chloride.

Suitable H-bond donors include, but are not limited to, lower alkyl alcohols such as C1-C10 alcohols with straight, branched or cyclic chains, aryl alcohols, and lower alkyl polyols with straight, branched or cyclic chains. For example, one may preferably utilize aliphatic polyethers of the general structure $HO—(RO)_n—H$ where the value of n is selected such that one achieves a viscosity of less than or equal to 10,000 centipoise and where R may be, e.g, an alkyl group such as $—CH_2CH_2—$ or a propyl group such as $—CH_2CH(CH_3)—$ or a mixture of ethyl and propyl groups. Preferably, the viscosity range is 10 centipoise to 1000 centipoise, more preferably 10-100 centipoise. The H-bond donors may also include diketones, aldehydes, amides, C3-C12 saccharides or disaccharides, and saturated or unsaturated fatty acids. Accordingly, the H-bond donor herein may also be chosen from one of urea, ethanol, propanol, phenol, ethylene glycol, triethylene glycol, propylene glycol, glycerol, acetylacetone, malonic acid, benzoic acid, oleic acid, stearic acid, formamide, arabinose, glucose, trehalose, xylose, fructose, dextrose, or sucrose. Common examples of suitable DES include, but are not limited to, mixtures of choline chloride (ChCl) with a H-bond donor, such as ethylene glycol (EG), triethylene glycol or glycerol.

Synthetic Pathways

The general method of preparing the luminescent composition according to the invention may be initially expressed as follows, which reaction is conducted in a DES and preferably with microwave heating:

$$A(X)_m + M(X)_n + zNH_4F \rightarrow AMFz + zNH_4X$$

wherein

A is an alkali (Group 1) or alkali earth (Group 2) metal or a mixture of one or more alkali and/or alkali earth metal;
X is a halogen or $NO_3$ group;
M is a di-, tri- or tetravalent metal or metalloid,
F is fluoride;
z is the integer 4 or 5;
m is the integer 1 or 2; and
n is the integer 3.

In connection with the above, it is noted that in some embodiments, a mixed alkali/alkaline earth metal luminescent compositions may be prepared. That is, one may employ a mixture of $A^1(X)_m$ and $A_2(X)_m$ in the above equation wherein $A^1$ and $A^2$ comprise different alkali or alkali earth metals such that one forms $A^1A^2MF_z$.

From the above, it can now be appreciated that the following ion exchange reactions can be employed to form the indicated tetrafluoride or pentafluoride photoluminescent particles in a DES according to the present disclosure:

$$NaCl + YCl_3 + 4NH_4F \rightarrow NaYF_4 + 4NH_4Cl$$

$$NaNO_3 + Y(NO_3)_3 + 4NH_4F \rightarrow NaYF_4 + 4NH_4NO_3$$

$$SrCl_2 + YCl_3 + 5NH_4F \rightarrow SrYF_5 + 5NH_4Cl$$

$$Sr(NO_3)_2 + Y(NO_3)_3 + 5NH_4F \rightarrow SrYF_5 + 5NH_4NO_3$$

In general, the AMFz and/or $A^1A^2MF_z$ compositions herein, such as $NaYF_4$, $NaLiYF_4$, or $SrYF_5$ are prepared by mixing in a microwavable vial the alkali/alkaline earth metal salt with a salt of the metal/metalloid of interest in the deep eutectic solvent until both salts have dissolved. The fluoride salt is then added in excess, such as up to a 60 fold excess of the $NH_4F$ to the selected $M(X)_n$ compound (e.g. $YCl_3$). Preferably, the fluoride salt is added at a 30-75 fold excess. The vial is then sealed and microwave heating is employed and the temperature is rapidly raised to 100° C. to 250° C. Microwave heating is reference to the use of electromagnetic radiation with wavelengths ranging from as long as one meter to as short as one millimeter, or equivalently, with frequencies between 300 MHz (0.3 GHz) and 300 GHz. More preferably, the temperature range with microwave heating is set at 125° C. to 175° C. and the temperature is controlled to +/−2° C. The pressure within the vial is preferably held in the range of 2.0-5.0 bar. More preferably, the pressures within the vial is monitored to 2.0 bar-4.0 bar, and more preferably not to exceed 3.0 and +/−0.4 bar. The temperature and pressure is sustained for a period of 0.5-1.5 hours.

The compositions prepared according to methods of the invention exhibit improved characteristics such as relatively high degrees of crystallinity, sub-micron particle size, relatively narrow polydispersity, and/or relatively high photofluorescent intensities. These are discussed more fully below.

As noted above, the fluoride-based luminescent phosphor particles prepared herein in a DES indicates a higher relative crystallinity relative to those luminescent particles prepared in non-DES systems. In order to evaluate this higher relative crystallinity, one may employ comparative x-ray diffraction techniques, where the relative intensity is plotted against 2θ, where θ is the angle between the incident x-ray beam and the sample. Specifically, the relative intensities of the diffraction peaks may be compared for the fluoride-based luminescent phosphors prepared herein in a DES versus those prepared in non-DES. With attention to FIG. 1A, the x-ray diffraction pattern is provided for β-NaGdF$_4$ prepared in a DES according to the general procedures herein along with the tabular data identifying, e.g, assigned peak number, the 2θ angle, and intensity (cps or counts per second). Specifically, the following reaction was employed with the above referenced microwave heating and pressure control within the sealed vial utilizing a DES of 2:1 glycerol/choline chloride:

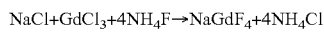

$$NaCl + GdCl_3 + 4NH_4F \rightarrow NaGdF_4 + 4NH_4Cl$$

Figure 1B:
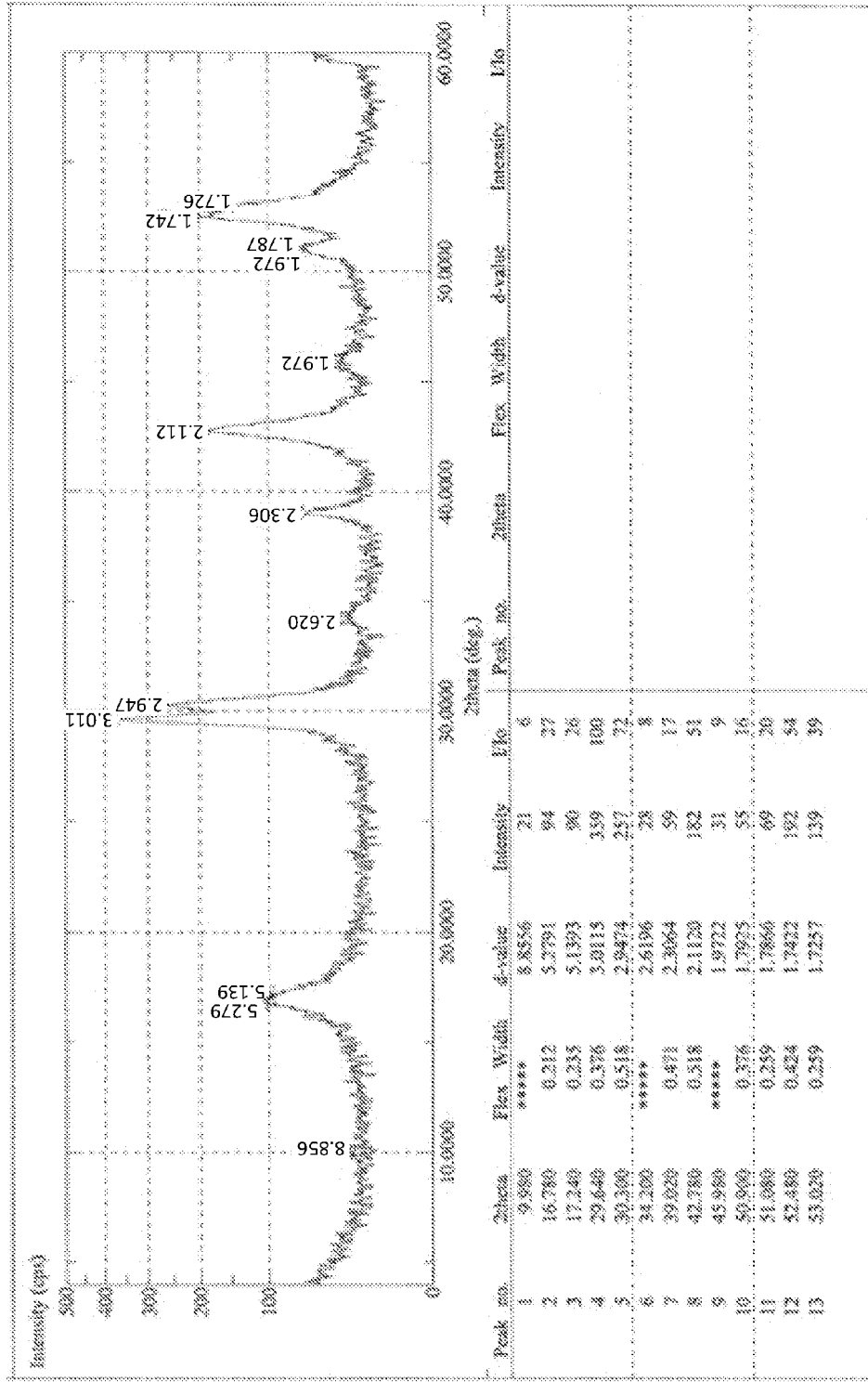

By comparison, the above reaction was employed without the use of the DES wherein the reaction was run in ethylene glycol. The x-ray diffraction pattern for the product formed is illustrated in FIG. 1B along with tabular data of assigned peak number, 2θ angle and intensity. From FIGS. 1A and 1B and the accompanying data indicated peak intensity for the identified peak numbers, one may select 10 peaks over the indicated 2θ range of 0-60, and calculate an average intensity. From FIG. 1A the following is determined:

| Peak Number | Intensity |
|---|---|
| 1 | 159 |
| 3 | 491 |
| 4 | 345 |
| 5 | 37 |
| 6 | 86 |
| 7 | 245 |
| 8 | 46 |
| 9 | 84 |
| 10 | 236 |
| Average | 191.11 |

From FIG. 1B the following is determined:

| Peak Number | Intensity |
|---|---|
| 2 | 72 |
| 4 | 332 |
| 5 | 185 |
| 6 | 26 |
| 7 | 63 |
| 8 | 143 |
| * | 35 |
| 10 | 63 |
| 11 | 172 |
| Average | 121.22 |

*Estimated value for peak at 2θ = 45.8°

As can be seen, the x-ray diffraction pattern identifies a 58.5% change or increase in average intensity of luminescent phosphors prepared in the DES system versus preparation in a non DES (i.e. ethylene glycol). Accordingly, it is contemplated herein that luminescent phosphors prepared herein may be characterized as having a plurality of distinguishing x-ray diffraction peaks at 2θ angles of 0-60 degrees that indicate an average relative intensity increase of at least 25% or greater, more preferably of at least 50% or greater, and as high as 60% or greater. In broader context, the luminescent phosphors prepared herein in a DES have a plurality of x-ray diffraction peaks at 2θ angles of 0-60 degrees that indicate an average relative intensity increase of 25% to 75% as compared to a luminescent phosphor prepared without the use of a DES. Such increase confirms the relatively higher crystallinity achieved by the method of the present invention.

In terms of particle size and particle size distribution, the luminescent phosphors prepared according to the methods of the present invention were observed to have a particle size of less than 1.0 μm. More specifically, the particle size of the luminescent phosphor particles is observed to fall within the range of 10 nm to 750 nm, 10 nm to 500 nm, 10 to 350 nm, or 10 to 100 nm, including all values therein at 1.0 nm increments.

Figure 2A:
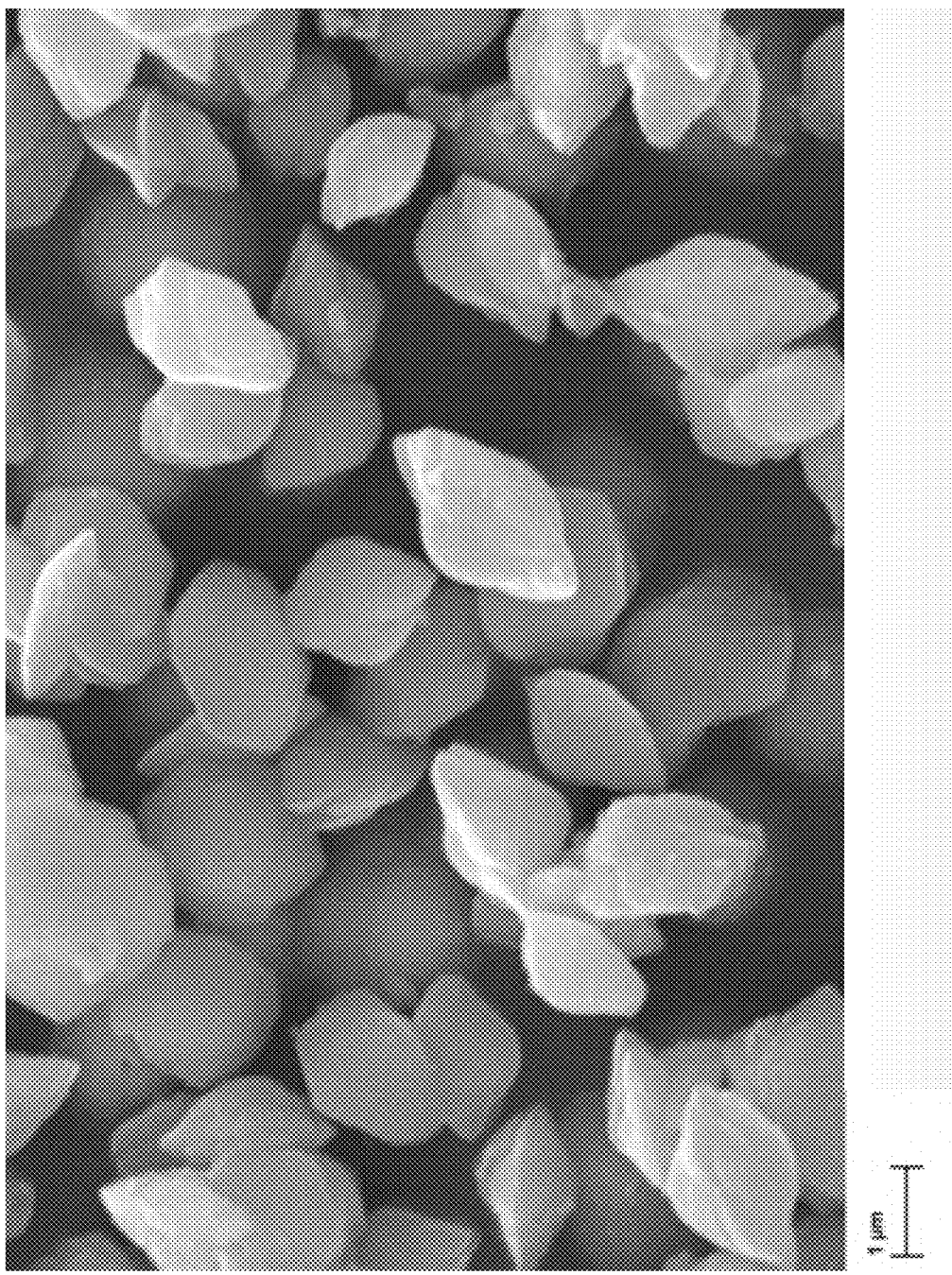
FIG. 2A is a micrograph of $NaGdF_4$ prepared in ethylene glycol.
Figure 2B:
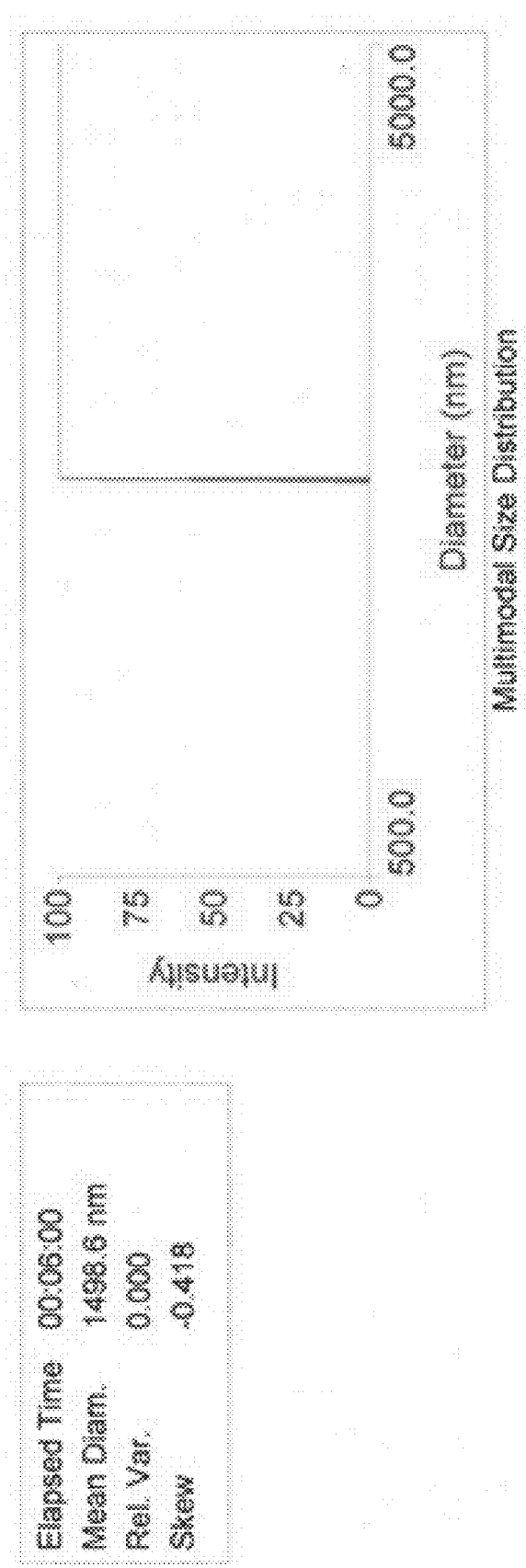
FIG. 2B is size distribution data for the $NaGdF_4$ illustrated in FIG. 2A.
Figure 2C:
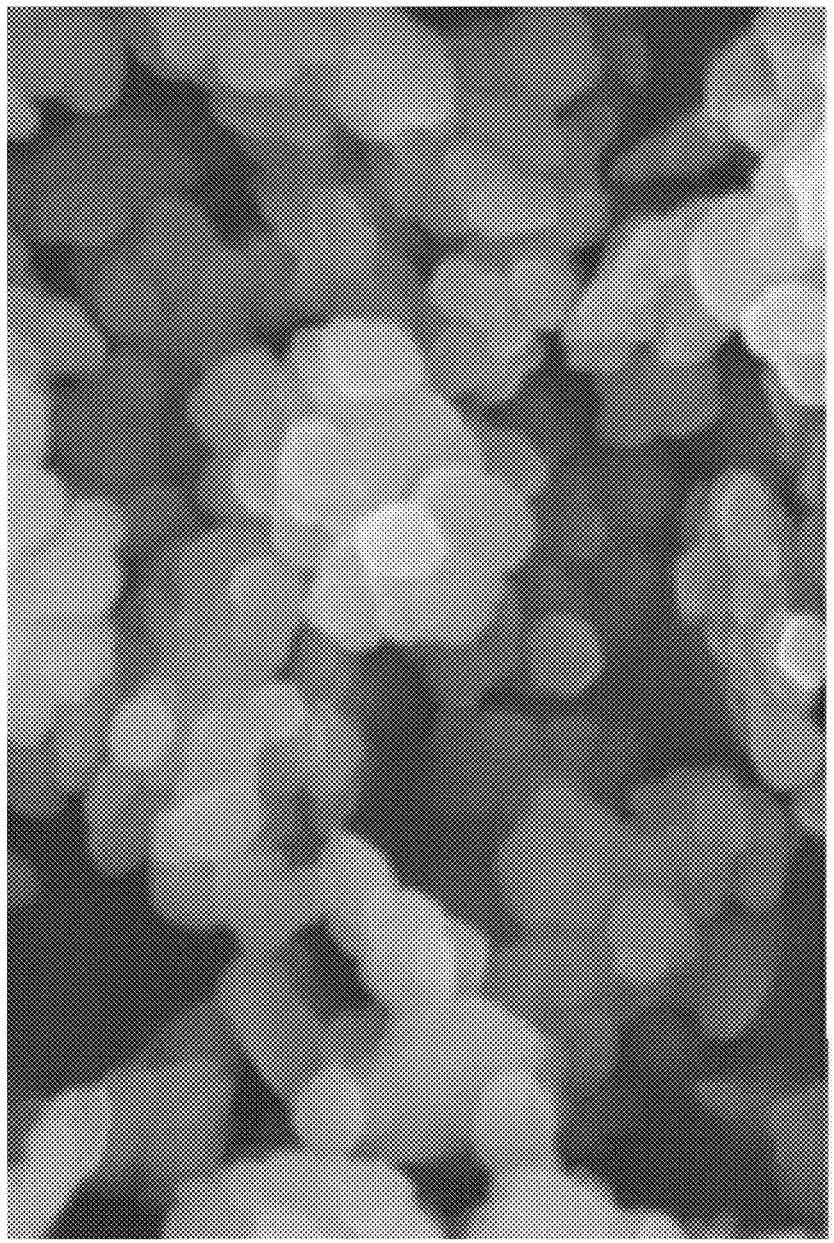
FIG. 2C is a micrograph of $NaGdF_4$ prepared in a DES (EG/ChCl 3:1) with microwave heating.
Figure 2D:
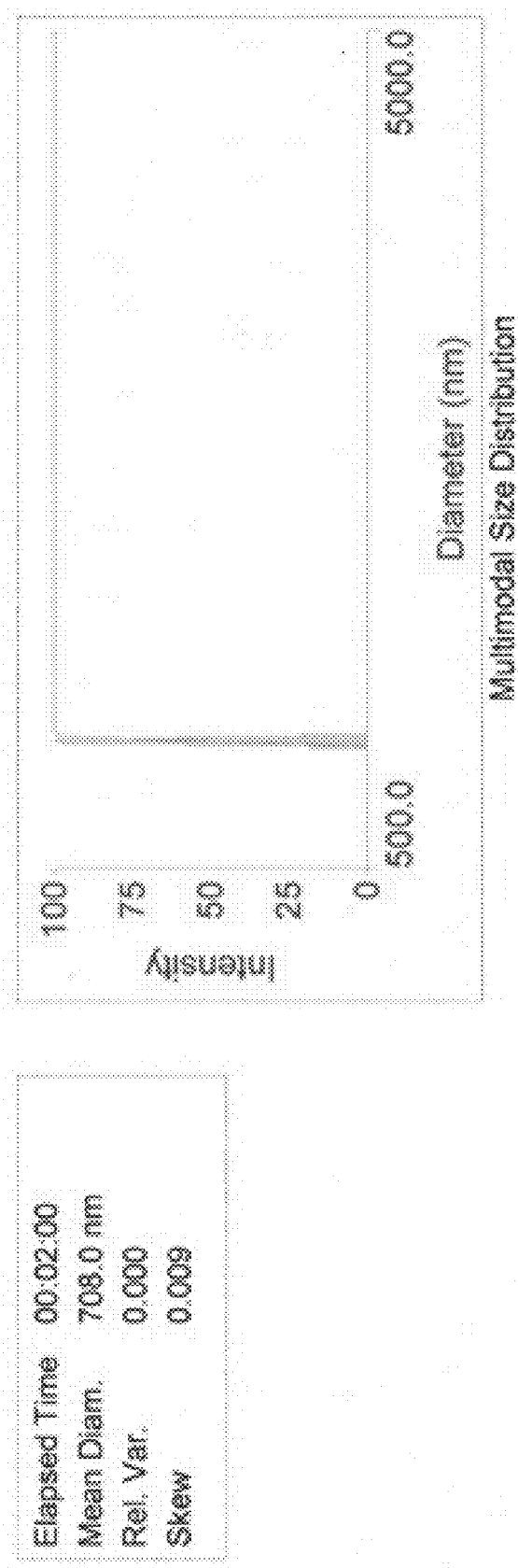
FIG. 2D is size distribution data for the $NaGdF_4$ illustrated in FIG. 2C.

With attention directed to FIG. 2A, a micrograph is provided for NaYF$_4$ particles prepared in ethylene glycol. FIG. 2B provides the corresponding size distribution data for this control synthesis. As can be observed, the mean diameter of the particles is 1498.6 nm, or about 1.5 μm. With attention directed to FIG. 2C, a micrograph is provided for NaYF$_4$ particles prepared in the DES system of ethylene glycol/choline chloride 3:1 with microwave heating. FIG. 2D provides the corresponding size distribution data for this synthesis. As can be observed, the mean diameter of the particles is 708 nm. The polydispersity for such synthesis is 20% or less, or within the range of 0.1-20%. More preferably, the polydispersity for the luminescent phosphors prepared herein in a DES is observed to fall in the range of 0.1-10%, 0.1-5%, as well as in the relatively narrow range of 0.1-2% or 0.1-1%. Reference to a polydispersity of 0.1-20% may be understood as the relative standard deviation of particle size, $\alpha = \sigma_g/D_{50}$, where $\sigma_g$ is the geometric standard deviation and $D_{50}$ is the mass-median particle diameter for a Gaussian particle size distribution.

Figure 3:
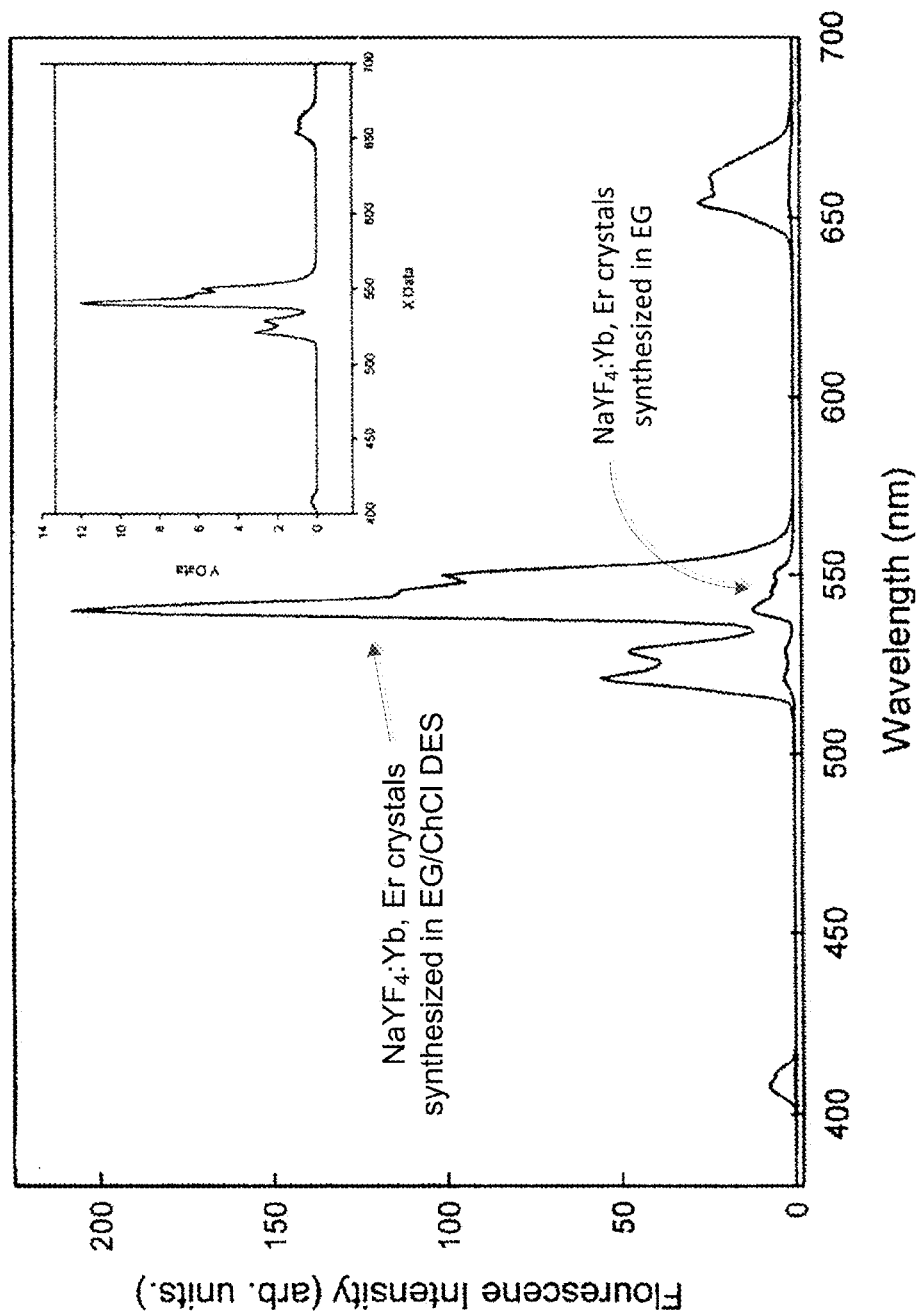
FIG. 3 shows a comparative visible photoluminescence spectra for submicron-sized $NaYF_4$:Yb,Er compositions prepared with EG alone or EG:ChCl (3:1) solvent systems.
Figure 4:
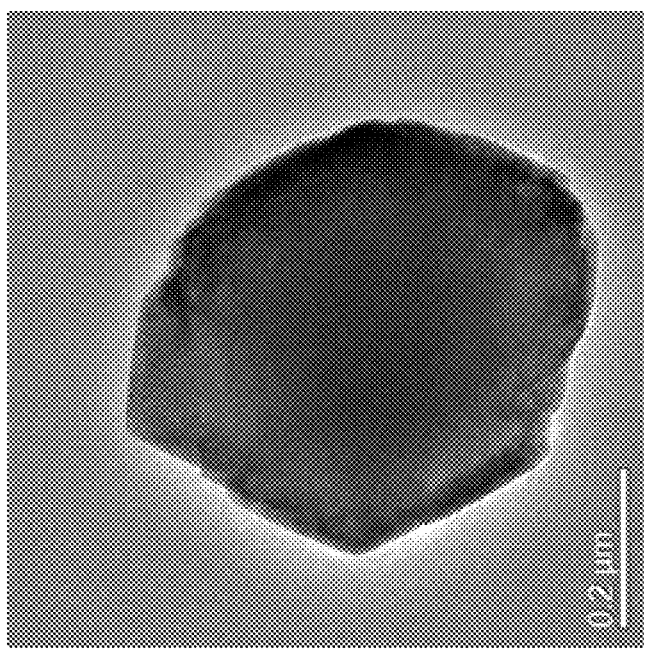
FIG. 4 is a single-crystalline particle TEM micrograph of $Na_{0.3}Li_{0.7}Y_{0.19}F_4$:$Yb_{0.8}$,$Tm_{0.01}$ prepared in an EG:ChCl (3:1) solvent system.
Figure 5:
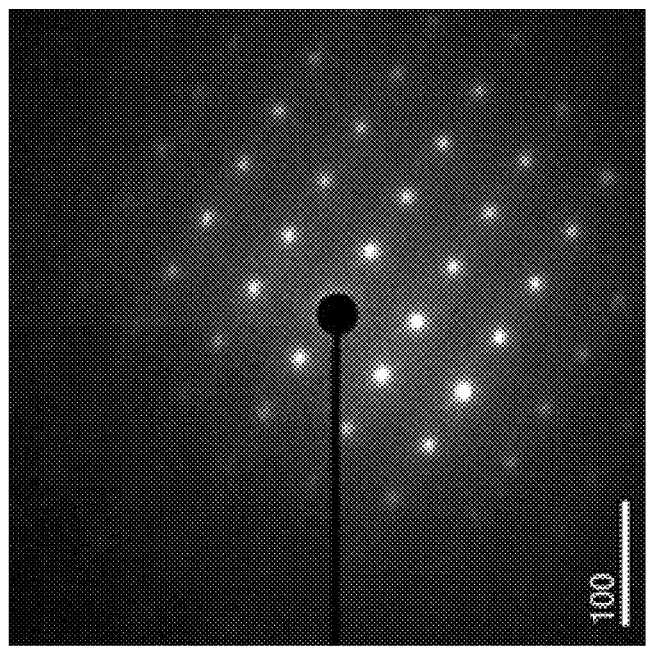
FIG. 5 is a single-crystalline particle hexagonal SAD pattern of $Na_{0.3}Li_{0.7}Y_{0.19}F_4$:$Yb_{0.8}$,$Tm_{0.01}$ prepared in an EG:ChCl (3:1) solvent system.

The compositions of the invention also have high relative photoluminescence. Attention is directed to FIG. 3 which compares the photoluminescence spectra for β-NaYF$_4$ that is codoped with ytterbium and erbium, prepared in a DES of EG/ChCl (3:1) in a microwave assisted synthesis as disclosed herein, versus preparation of the same compound in ethylene glycol. As can be observed, for preparation of a luminescent phosphor in a DES, there is a relatively large increase in brightness observed and the fluorescence intensity over the wavelength of 500 nm to 600 nm shows peak heights of greater than 50 arbitrary units, more specifically 50-225 arbitrary units. For a luminescent phosphor prepared in a non-DES (ethylene glycol), peak heights were ≤25 units within the same wavelength range. The upconversion fluorescence (where the wavelength of the emitted light is shorter than the exciting light) is shown in the insert. Accordingly, the luminescent phosphors of the present disclosure may be employed to provide upconversion fluorescence where longer wavelength, such as infrared photons are absorbed by the luminescent phosphor followed by emission of higher energy (shorter wavelength) photon.

Accordingly, the luminescent phosphors prepared herein in a DES have a fluorescence intensity over the wavelengths of 500 nm to 600 nm that indicate a two-fold (2×) to ten-fold (10×) increase in peak height (arbitrary units) as compared to the same luminescent phosphors prepared in a non-DES solvent, confirming the increase in photoluminescence intensity for the preparation of luminescent phosphors as prepared in the present disclosure.

The luminescent phosphors disclosed herein are particular well suited for in vivo therapeutic or diagnostic applications.

In particular, particle size plays an important role in the half-life of the composition in the blood stream. Preferably, particles in the 100 nm to 200 nm range provide the longest circulation half-life with relatively minimal uptake by inflammatory cells. Accordingly, the present disclosure relates to the preparation of a luminescent phosphor in a DES, wherein the luminescent phosphors are prepared at a particle size of less than 1.0 μm, and more preferably, at a particle size of 100 nm to 200 nm. The particles may then be employed for non-invasive bio-imaging and/or non-invasive bio-detection, the method comprising the step of administering to a subject the luminescent phosphors prepared in a DES in accordance with the present disclosure.

As noted above, the particles herein can also provide for upconversion luminescence, making them particularly well-suited for upconversion bioimaging with relatively lower autofluorescence and relatively higher signal to noise ratios. Accordingly, the present disclosure additionally relates to the preparation of upconversion fluorescent nano-structured particles in a DES for use in medicine. In particular, there is provided upconversion fluorescent nano-structured particles in DES for use in photodynamic therapy or for use in non-invasive imaging. One example of photodynamic therapy is in cancer cells. There is also provided the use of at least one upconversion fluorescent nano-structured material according to any aspect of the invention in the preparation of a medicament for photodynamic therapy.

EXAMPLES

Microwave Synthesis in Ethylene Glycol

For comparative purposes, NaYF$_4$ nanocrystals were prepared from chloride precursors in ethylene glycol using a modification of the methods of Niu et al. *J. Mater. Chem.* 2012, 22, 21613. The overall ion exchange reaction is illustrated below:

$NaCl+YCl_3+4NH_4F \rightarrow NaYF_4+4NH_4Cl$

To prepare NaYF$_4$, NaCl (0.75 mmol), and YCl$_3$ (0.75 mmol) were added to 20 mL of ethylene glycol in a 30 mL borosilicate microwave vial. The salts were stirred at room temperature until dissolved. Ammonium fluoride was added in 60-fold excess (relative to yttrium, i.e. 45 mmol), to the previously homogenized solution and stirred. Individual reactions were then sealed and stirred magnetically at 600 rpm before heating using the "as fast as possible" microwave setting (800 W maximum power, Model Monowave 300, Anton Paar USA, Ashland, Va.) to 160±2° C. for 50 minutes. The temperature and pressure were continuously monitored. At no time did any reaction exceed a pressure of 6 bar.

To produce doped samples, other alkaline chlorides (e.g. KCl, LiCl) and/or rare-earth chlorides (e.g. YbCl$_3$, TmCl$_3$, HoCl$_3$, etc.) were substituted directly for the homovalent species. As an illustration, $K_{0.10}Na_{0.90}Y_{0.78}F_4$:$Yb_{0.20}$,$Er_{0.02}$ would be prepared by replacing 10 mol % of the NaCl with KCl (0.075 mmol) and 22 mol % of the YCl$_3$ with a combination of YbCl$_3$ (0.15 mmol) and ErCl$_3$ (0.015 mmol).

DES-Enhanced Microwave Synthesis.

NaYF$_4$ nanocrystals according to the present disclosure were prepared from chloride precursors in a DES with a 3:1 molar ratio of ethylene glycol to choline chloride. The reaction was conducted, as above, in a total solution volume of 20 mL with magnetic stirring in 30 mL borosilicate vials. The reaction batches were rapidly heated to 160±2° C. and the temperature was sustained for 50 minutes. The temperature and pressure were continuously monitored, with a maximum pressure of 3.0±0.4 bar.

Nitrate salts may be directly substituted for chlorides in either of the above procedures according to the following reaction:

$NaNO_3+Y(NO_3)_3+4NH_4F \rightarrow NaYF_4+4NH_4NO_3$

Also, the alkaline species may be directly replaced by divalent metal salts in order to produce pentafluoride compositions accordingly to the following:

$SrCl_2+YCl_3+5NH_4F \rightarrow SrYF_5+5NH_4Cl$ $Sr(NO_3)_2+Y(NO_3)_3+5NH_4F \rightarrow SrYF_5+5NH_4NO_3$ As an illustration, SrYF$_5$ can be prepared by maintaining the concentration of Y$^{3+}$ at 0.75 mmol, while replacing the NaCl completely with SrCl$_2$ (0.375 mmol).

Synthesis of β-NaGdF$_4$ Comparing Ethylene Glycol and Glycerol:ChCl (2:1) Solvents β-NaGdF$_4$ luminescent phosphor having a particle size of about 100 nm has been produced using microwave-assisted heating in EG. As discussed above, the crystallinity was enhanced with the use of a 2:1 glycerol/ChCl DES, as shown by comparing the intensities of any of the XRD peaks as shown in FIGS. 1A and 1B.

Size reduction of β-NaYF$_4$ Particles Comparing Ethylene Glycol and EG:ChCl (3:1) Solvents As noted above in FIGS. 2A-2D, undoped β-NaYF$_4$ particles prepared by microwave-assisted reaction in EG have an average particle size of 1498.6 nm. By contrast, the mean diameter of the particles prepared in a DES was 708 nm, representation about a 50% decrease in average particle size after replacing the solvent with a 3:1 EG/ChCl DES while performing the reaction under the same conditions.

Increase in Photoluminescence Intensity for Yb/Er Co-Doped NaYF$_4$ Comparing Ethylene Glycol and EG:ChCl (3:1) Solvents As discussed above in the context of FIG. 3, the replacement of EG by a DES system provides a dramatic increase in brightness of the composition prepared under similar process conditions but for the solvent. Using a 3:1 EG/ChCl DES in a microwave-assisted synthesis has produced a green phosphor with an order-of-magnitude increase in brightness versus EG alone. While larger luminescent phosphors are generally brighter due to a reduced specific surface area, the intense increase in brightness in this case is believed attributed to the relatively higher level of particle crystallinity afforded by the DES and since the average particle size has also decreased following the solvent change.

Figure 6:
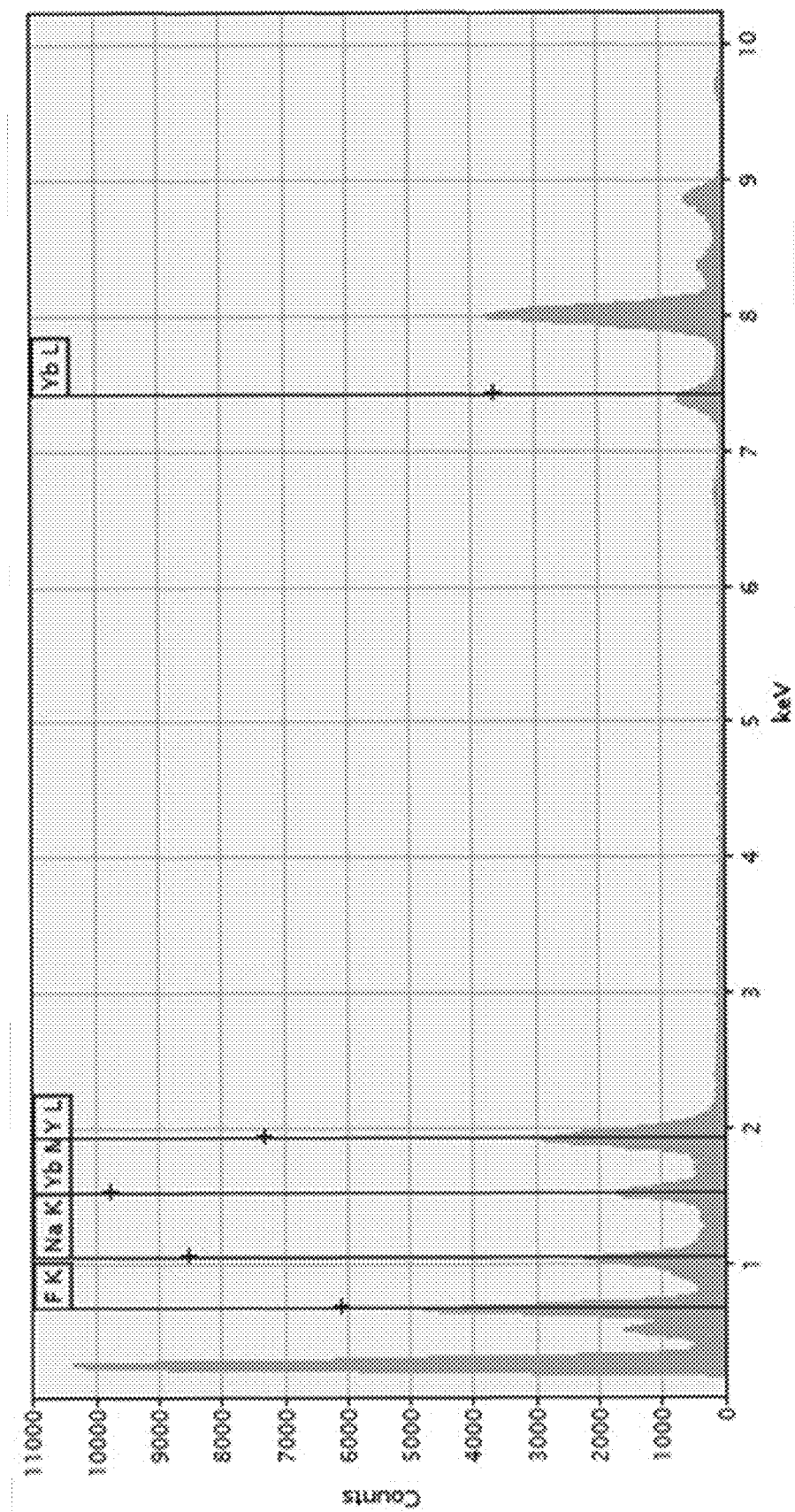
FIG. 6 is an EDX spectrum from the $Na_{0.3}Li_{0.7}Y_{0.19}F_4$:$Yb_{0.8}$,$Tm_{0.01}$ composition prepared in EG:ChCl (3:1) solvent system.

Partial Lithiation of β-NaYF$_4$ Submicron Particles Comparing Ethylene Glycol and EG:ChCl (3:1) Solvents Lithium substitution in the β-NaYF$_4$ synthesis provides luminescent phosphors with increased photoluminescent intensities. Single-particle TEM analysis and hexagonal SAD patterns show that the lenticular luminescent phosphor structure is dominated by NaYF$_4$ Moreover, the particles contain nitrogen, which is consistent with a partial NH$_4^+$ substitution. See FIG. 6 which shows relatively strong carbon (0.277 keV)

and weak nitrogen (0.392 keV) corresponding to graphite substrate and minor ammonium substituents, respectively.

Figure 7:
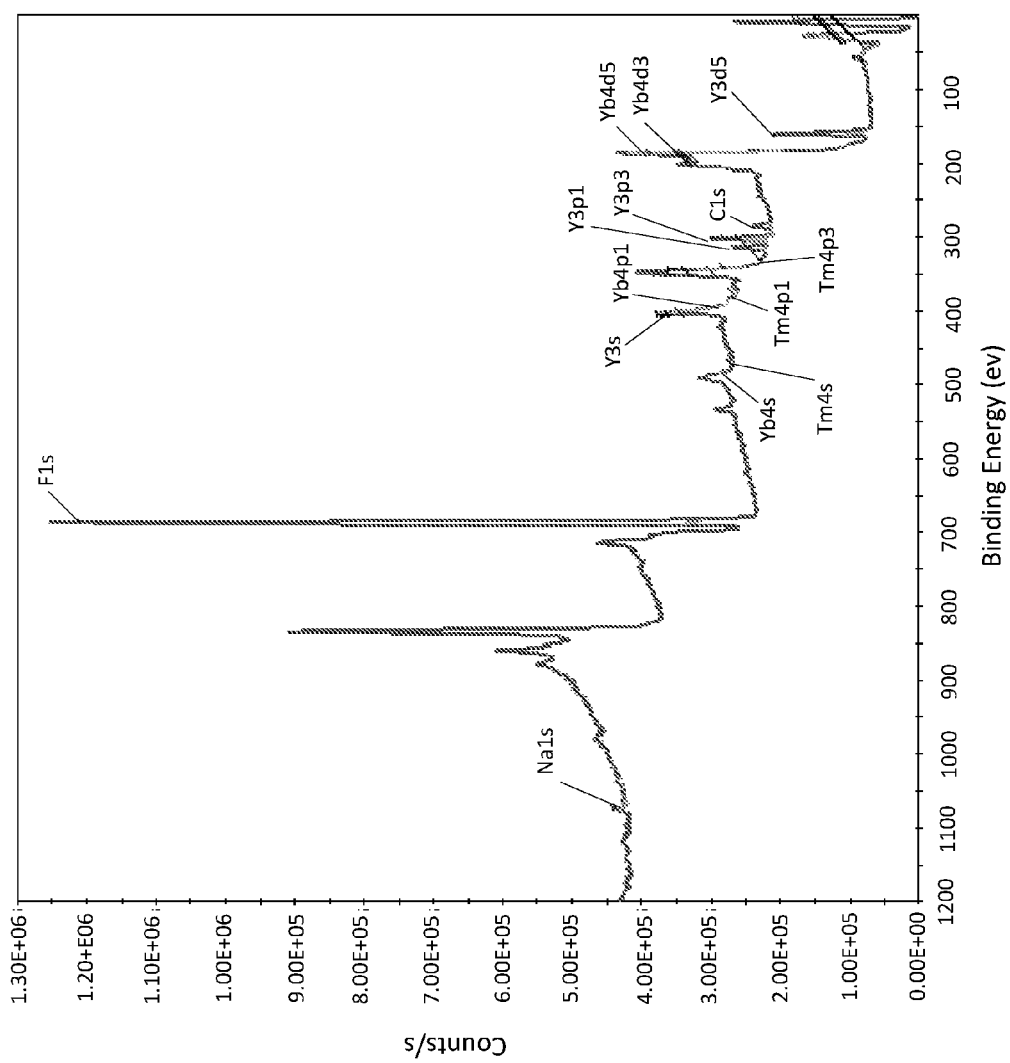
FIG. 7 is an X-ray photoelectron spectroscopy (XPS) reporting on $Li^+$ substitution.

FIG. 7 provides X-ray photoelectron spectroscopy (XPS) shows that Li$^+$ substitution is dominant in the surface composition. This resulting enhancement of the photoluminescent intensity is a useful outcome. It has been observed that the substitution of NaCl by LiCl in the synthesis using EG as a solvent also leads to the formation of a non-photoluminescent side product, identified as NH$_4$Y$_2$F$_7$. This side product is relatively difficult to separate from the desired luminescent phosphors due to their co-precipitation from EG. The use of a 3:1 EG/ChCl DES eliminates precipitation of the side product, leading to a clean separation of the desired photoluminescent compound.

β-NaYF$_4$ Synthesis Scalability

Synthesis of luminescent phosphors in DES as disclosed herein is now scalable to sealed vessels heated with conventional methods. It is contemplated that the scale may provide as much as 50 g product per liter of solvent in single batches of 50 L in size. By contrast, preparation of LP in microwave-assisted EG is limited by vessel size, typically at vessel sizes of no more than 1 L. Luminescent phosphors prepared this way in DES have improved crystallinity and photoluminescence compared to those prepared in EG.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method for preparing a luminescent phosphor (AMFz) comprising carrying out the following reaction in a deep eutectic solvent with heating and under pressure:

A(X)$_m$+M(X)$_n$+zNH$_4$F→AMFz+zNH$_4$X wherein
A is an alkali (Group 1) or alkali earth (Group 2) metal or a mixture of one or more alkali and/or alkali earth metal;
X is a halogen or NO$_3$ group;
M is a di-, tri- or tetravalent metal or metalloid,
F is fluoride;
z is the integer 4 or 5;
m is the integer 1 or 2; and
n is the integer 3.

2. The method of claim 1 wherein the deep eutectic solvent comprises an ionic salt and a hydrogen bond donor having a eutectic melting point of less than or equal to 100° C.

3. The method of claim 2 wherein the ionic salt and hydrogen bond donor are present at a level of 1:10 to 10:1.

4. The method of claim 3 wherein the hydrogen bond donor comprises an aliphatic polyether of the structure HO—(RO)$_n$—H wherein n is selected to provide a viscosity of less than or equal to 10,000 centipoise and wherein R is an alkyl group.

5. The method of claim 1 wherein heating provides a temperature of 100° C. to 250° C.

6. The method of claim 1 wherein A(X)$_m$ comprises a mixture of A$^1$(X)$_m$ and A$_2$(X)$_m$ wherein A$^1$ and A$^2$ are different alkali or alkali earth metals and forming a luminescent phosphor having the formula A$^1$A$^2$MF$_z$.

7. The method of claim 1 wherein the pressure is 2.0 bar to 5.0 bar.

8. The method of claim 6 wherein the pressure is 3.0 bar +/−0.4 bar.

9. The method of claim 1 wherein the luminescent phosphor (AMFz) indicates a plurality of x-ray diffraction peaks at 2θ angles of 0-60 degrees with an average relative increase in intensity of 25% or greater as compared to the same luminescent phosphor (AMFz) prepared in a non-deep eutectic solvent.

10. The method of claim 1 wherein the luminescent phosphor (AMFz) indicates a plurality of x-ray diffraction peaks at 2θ angles of 0-60 degrees with an average relative increase in intensity of 50% or greater as compared to the same luminescent phosphor (AMFz) prepared in a non-deep eutectic solvent.

11. The method of claim 1 wherein the luminescent phosphor (AMFz) has a particle size of less than 1.0 μm.

12. The method of claim 1 wherein the luminescent phosphor (AMFz) has a particle size of 10 nm to 750 nm.

13. The method of claim 1 wherein the luminescent phosphor (AMFz) has a particle size of 10 nm to 100 nm.

14. The method of claim 1 wherein the luminescent phosphor (AMFz) indicates a greater fluorescence intensity at wavelengths of 500 nm to 600 nm as compared to the same luminescent phosphor (AMFz) prepared in a non-deep eutectic solvent.

15. A method for preparing a luminescent phosphor (AMFz) comprising carrying out the following reaction in a deep eutectic solvent with heating and under pressure:

A(X)$_m$+M(X)$_n$+zNH$_4$F→AMFz+zNH$_4$X wherein
A is an alkali (Group 1) or alkali earth (Group 2) metal or a mixture of one or more alkali and/or alkali earth metal;
X is a halogen or NO$_3$ group;
M is a di-, tri- or tetravalent metal or metalloid,
F is fluoride;
z is the integer 4 or 5;
m is the integer 1 or 2;
n is the integer 3; and
said deep eutectic solvent comprises an ionic salt and a hydrogen bond donor wherein said hydrogen bond donor comprises an aliphatic polyether of the structure HO—(RO)$_n$—H wherein n is selected to provide a viscosity of less than or equal to 10,000 centipoise and wherein R is an alkyl group and wherein said reaction is carried out at a temperature of 100° C. to 250° C. at a pressure of 2.0 bar to 5.0 bar and said luminescent phosphor (AMFz) has a particle size of less than 1.0 μm.

* * * * *